US007676406B2

(12) United States Patent
Kinnear

(10) Patent No.: US 7,676,406 B2
(45) Date of Patent: Mar. 9, 2010

(54) METHOD AND SYSTEM FOR CONSOLIDATING COMMODITY FUTURES CONTRACTS HAVING GUARANTEED PHYSICAL DELIVERY

(76) Inventor: Kirk P. Kinnear, 42 Will-Merry La., Greenwich, CT (US) 06831

( * ) Notice: Subject to any disclaimer, the term of this patent is extended or adjusted under 35 U.S.C. 154(b) by 0 days.

(21) Appl. No.: 10/461,835

(22) Filed: Jun. 13, 2003

(65) Prior Publication Data

US 2004/0148249 A1 Jul. 29, 2004

Related U.S. Application Data

(60) Provisional application No. 60/442,605, filed on Jan. 24, 2003.

(51) Int. Cl.
G06Q 40/00 (2006.01)
(52) U.S. Cl. .............................. 705/35; 705/36; 705/37
(58) Field of Classification Search .................. 705/37, 705/35, 36 R, 36
See application file for complete search history.

(56) References Cited

U.S. PATENT DOCUMENTS

| 4,903,201 | A | 2/1990 | Wagner | |
|---|---|---|---|---|
| 6,321,212 | B1 | 11/2001 | Lange | |
| 6,390,472 | B1 * | 5/2002 | Vinarsky | 273/278 |
| 6,493,683 | B1 * | 12/2002 | David et al. | 705/37 |
| 6,615,188 | B1 * | 9/2003 | Breen et al. | 705/37 |
| 2002/0120555 | A1 * | 8/2002 | Lerner | 705/37 |
| 2003/0069830 | A1 * | 4/2003 | Morano et al. | 705/37 |
| 2004/0230520 | A1 * | 11/2004 | Reding et al. | 705/37 |

OTHER PUBLICATIONS

Sas, Blanche, Legal aspects of risk management in energy markets, Petroleum Economist, Jul. 1992, pp. 1-11.*
Jake Bernstein, How the Futures Markets Work, 1989, New York Institute of finance, pp. 32-37.*
Liz Bossley, Getting the Right Price for the Right Brent Contract, Dec. 1999 & Jan. 2000, Petroleum Economist, both pp. 1-6.*
"Market Forces : Anyone for Monopoly?" Energy Compass. London: Oct. 4, 2002. p. 1.*
"Commodity Training Manual". Chicago Board of Trade. 1998.*
Lewis, Norman."The New Roget's Thesaurus." New York: G.P. Putnam's Sons, 1978. (4 pages).*

* cited by examiner

Primary Examiner—James P Trammell
Assistant Examiner—Elda Milef
(74) Attorney, Agent, or Firm—Stroock & Stroock & Lavan LLP

(57) ABSTRACT

A guaranteed physical delivery futures contract and method and system for consolidating same are disclosed. The method includes guaranteeing physical delivery for future positions of market participants having open first-nearby time positions of a particular size, making additions to or subtractions from open first-nearby time positions of market participants that are less than the particular size and offsetting the additions to and subtractions from market participants' open first-nearby time positions with opposite positions in a second-nearby time. The system includes one or more servers and communications links, the communications links for receiving position data, including open positions, and the servers are configured to make additions to or subtractions from open first-nearby time positions less than a certain size and adjust market participant second-nearby time positions based on the additions to or subtractions from open first-nearby time positions. In certain embodiments, the underlying commodity is crude oil and the particular size is the size of a cargo shipment, about 600,000 barrels.

50 Claims, 4 Drawing Sheets

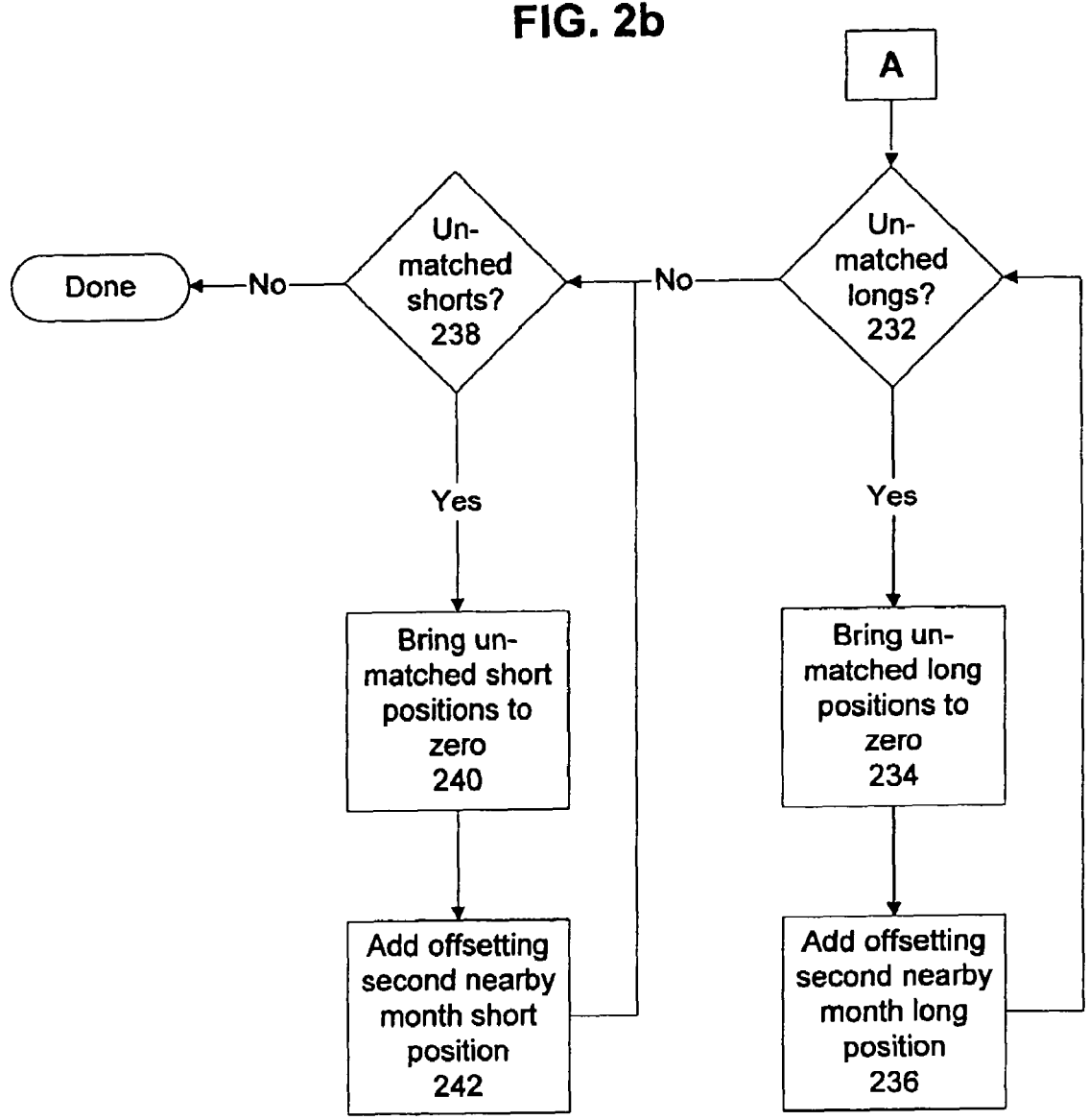

METHOD AND SYSTEM FOR CONSOLIDATING COMMODITY FUTURES CONTRACTS HAVING GUARANTEED PHYSICAL DELIVERY

CROSS-REFERENCE TO RELATED APPLICATION

This application claims the benefit of U.S. Provisional Application Ser. No. 60/442,605, entitled Guaranteed Physical Delivery Futures Contract and Method of Consolidating Same, filed Jan. 24, 2003, which application is hereby incorporated by reference herein.

BACKGROUND OF THE INVENTION

Several commodity exchanges, such as the International Petroleum Exchange, the New York Mercantile Exchange, the Tokyo Commodity Exchange, and the Singapore Exchange have over the years launched, or attempted to launch, futures contracts referencing one or more of the world's commonly traded crude oil grades. These grades are referred to by the petroleum industry and financial community as crude oil benchmarks or markers, and include Brent, Dubai, Oman, Tapis, Urals and West Texas Intermediate (WTI). In order for a crude type to be considered a true international marker, the grade must be capable of being transported from the oil field where it is produced, to refining centers around the world. The most common method of transporting crude from export terminals to oil refineries, is via large ocean-going vessels. (Presently, however, WTI is precluded from being a true international marker crude due to export restrictions imposed by the United States government.)

Presently, all commodity exchanges with petroleum futures contracts referencing one or more international crude markers are cash settlement contracts. Under the terms of these contracts, all open long or short futures positions at contract expiry are financially settled against an index. Due largely to load-port terminal and vessel shipping constraints, commodity exchanges that have developed international marker crude oil contracts have chosen to use financial settlement to meet obligations resulting from open positions held through expiry of the contract. Under this previous method, the futures exchange calculates an index price on the final day of trading. All outstanding open futures positions held beyond contract expiry, are financially liquidated, or cash-settled against the index price. No physical delivery of the commodity takes place.

In the past, some crude oil futures exchanges with cash settlement contracts have purported their contracts are in fact physical delivery. These claims relate solely to exchange for physical (EFP) provisions within the contract, and are misleading and are fallacious. An EFP simply involves physical delivery from one participant to another with a concomitant assumption of equal, but opposite futures position by participants. EFP trades are strictly voluntarily. The EFP transaction is simply an optional trading tool, that market participants can choose to use to shift physical positions "on" or "off" a futures exchange, thus optionally allowing participants to convert physical delivery into futures positions and vice versa. The futures exchange does not mandate these trades, nor does it match the market participants in an EFP transaction. Additionally, the market participant in an EFP transaction assumes the performance and financial risk of the counterparty, with respect to the physical portion of the EFP. In an EFP transaction market participants lose the financial protection provided by the futures exchange. Consequently, futures exchanges cannot assure market participants physical delivery under their cash settlement contracts, and claims to the contrary are incorrect. As such, a need exists, for a futures contract that guarantees physical delivery.

The major unsolved problem futures exchanges have faced in the past when trying to structure a physical delivery contract for commodities that load in bulk, is developing a product that trades in lots large enough to meet the minimum requirements of producers, consumers, and hedgers, commonly referred to as "commercials," and small enough to appeal to a wide range of investors, speculators, and exchange floor locals, commonly referred to as "non-commercials." A physical delivery contract ideally should satisfy the needs of both commercials and non-commercials.

In addition to not providing physical delivery of the commodity, cash-settlement futures contracts for commodities that load on large ocean-going vessels present other difficulties for market participants attempting to manage risk. These risks include exposure to pricing distortions resulting from large highly leveraged futures positions held by one or more market participant and pricing basis risk (i.e., the risk associated with the difference between the futures exchange closing price on expiry and the final published index price).

Exposure to pricing distortions occurs, at least in part, because exchanges with cash-settlement futures contracts have not imposed position limits on individual market participants. All futures positions held through expiry are liquidated by the exchange, and financially settled at the index price. This contract feature enables market participants to accumulate and retain large futures positions, through expiry, as leverage for large physical positions in the underlying commodity. This may distort prices and prevent convergence of the futures and physical price of the commodity upon contract expiry.

Basis risk occurs because, the final index price, against which all open positions are financially settled, is typically not released by the futures exchange until well after the close of trading. Some exchanges do not publish the index price until the following business day because details of the physical transactions and market assessments used in the calculation of the index are often delayed, as price reporting services gather, verify and publish price information.

To avoid pricing basis risk against the index, market participants with open futures positions on the final trading day must ratably replicate all the physical trades during the index period. This is infeasible as the index assessment period can be as long as twenty-three (23) hours, and information on the concluded physical trades that generate the index is not available to the market participant in real-time.

Furthermore, minimum loading volume for delivery under a single contract in the forward physical market for commodities that load on large, ocean-going vessels is a significant multiple of the size of a single futures contract in the same commodity. For example, the difference is approximately 600,000 barrels for the physical forward contract verses 1,000 barrels for the futures contract. In liquid natural gas (LNG), the difference is approximately 138,000 CBM verses 10,000 MMBtu for the futures contract. The large size of a single physical contract makes it difficult to liquidate positions ratably during the index period and, therefore, to avoid basis risk.

Thus, a need exists for an improved futures contract and, more specifically, a futures contract guaranteeing physical delivery of the underlying commodity that reduces exposure to pricing distortions and basis risk.

SUMMARY OF THE INVENTION

The present invention satisfies these and other needs. One embodiment of the present invention relates to the method of automatic conversion, of all open cargo-size futures positions into physical delivery. The method includes guaranteeing physical delivery for future positions of market participants having open first-nearby time positions of a particular size, making additions to or subtractions from open first-nearby time positions of market participants that are less than the particular size and offsetting the additions to and subtractions from market participants' open first-nearby time positions with opposite positions in a second-nearby time.

As will be appreciated, certain embodiments of the present invention relate to the consolidation of futures positions held through contract expiry, and the conversion of open futures positions into physical positions, without exposure to outright (non-spread) price risk, during the time period required for position consolidation.

Other embodiments of the present invention allow market participants' open positions to be aggregated. In such an embodiment, market participants with open long or short positions of less than cargo size are aggregated to achieve a combined cargo-sized position. Apportionment of the commodity occurs later, for example, at the delivery port, thereby allowing participants to take physical delivery.

In still other embodiments, a system for providing guaranteed physical delivery includes one or more servers and communications links, the communications links for receiving position data, including open positions, and the servers are configured to make additions to or subtractions from open first-nearby time positions less than a certain size and adjust market participant second-nearby time positions based on the additions to or subtractions from open first-nearby time positions.

In certain embodiments, the underlying commodity is crude oil and the particular size is the size of a cargo shipment, about 600,000 barrels.

BRIEF DESCRIPTION OF THE DRAWINGS

The following drawing figures, which form a part hereof, provide illustrative embodiments of the present invention and are not meant to be limiting of the scope thereof.

FIGS. 2a and 2b are a flow chart illustrating the process of matching open positions according to one embodiment of the present invention.

DETAILED DESCRIPTION OF CERTAIN EMBODIMENTS

Figure 1A:
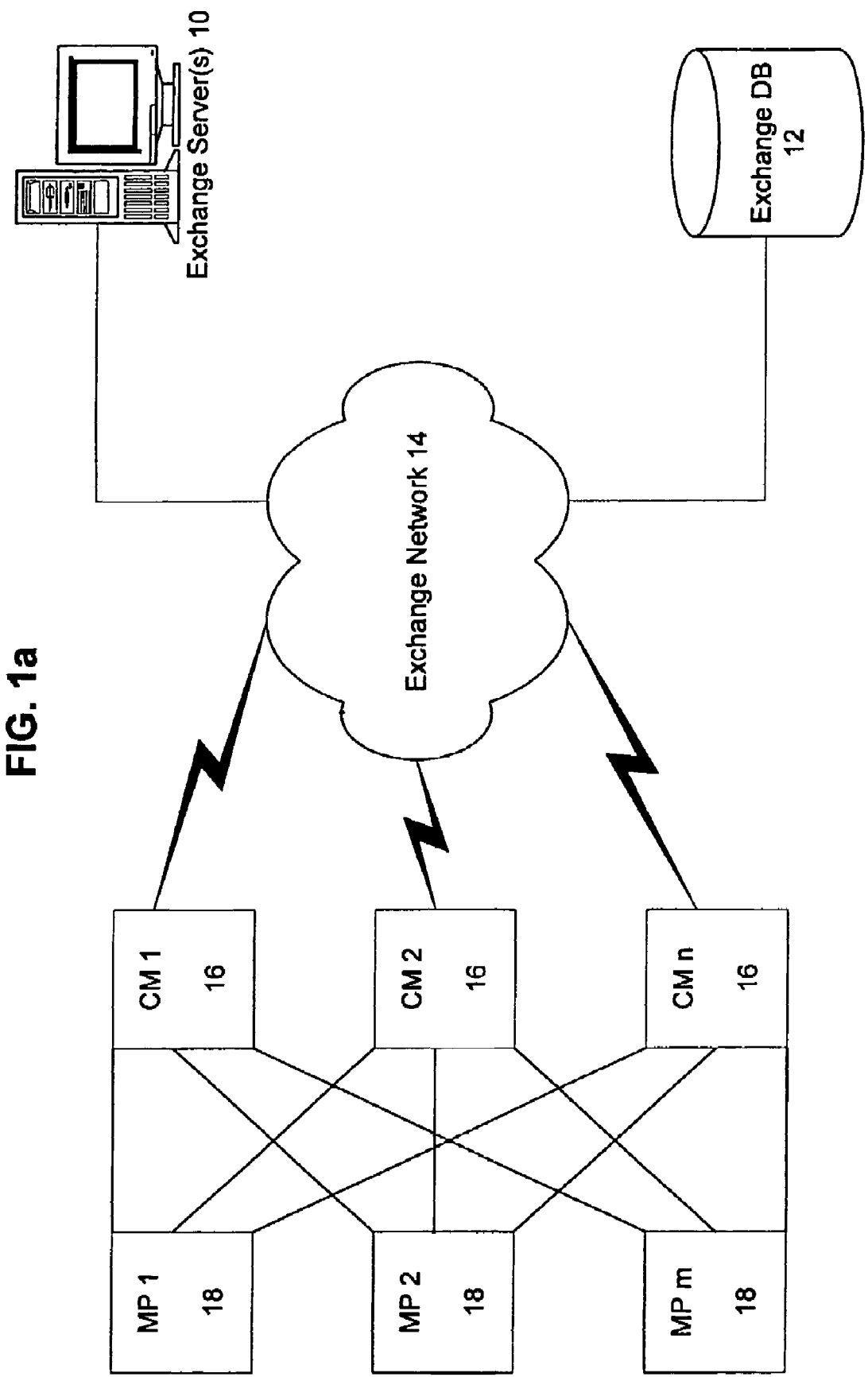
FIG. 1a is a schematic illustrating the system according to one embodiment of the present invention.

Certain embodiments of the present invention will now be described with reference to the foregoing figures. In general, such embodiments relate to a process where upon expiry of a futures contract, purchase and sale obligations for a commodity can be satisfied by physical delivery of the commodity, instead of financial settlement. More specifically, certain embodiments are directed to futures contracts, that are consolidated using a process that guarantees qualified futures market participants physical delivery of the commodity.

As an initial matter, although the present invention is particularly suited for use with commodities that are delivered in relatively large, generally fixed quantities (for example, crude oil, as it loads on large, ocean-going vessels, having, for example, cargo capacity of 600,000 barrels or 600 lots) and certain embodiments are described in terms of crude oil and "cargo-size" shipments, it is to be understood that any commodity and shipment size can be used. Thus, the term "cargo-size" is used broadly to refer to the shipping amount, volume or quantity of whatever physical commodity is the subject of the contract. Such other commodities include, for example, liquid natural gas (LNG), petroleum products, fuel oil, liquid propane gas (LPG), ethanol, fertilizer and the like.

As will be appreciated based on the disclosure set forth herein, the futures contract and consolidation process for guaranteeing physical delivery according to the present embodiment of the present invention provides convergence between the exchange traded futures for a commodity and the underlying physical commodity at contract expiry. Such convergence is a function of the futures exchange delivery terms being directly linked to the prevailing industry physical forward contract.

In the present embodiment, the futures contract is administered and consolidated by a futures exchange and associated futures clearinghouse using a process in which the following terms have the definitions set forth below.

The "First-Nearby Month" shall mean the then-current month in which trading is being transacted and for which physical delivery will be determined. In contrast, the "Second-Nearby Month" shall mean the month immediately following the First-Nearby Month. It should be understood that although the present embodiment utilized months, other divisions time may be used. Furthermore, such periods, whether months or otherwise, may begin and end as set by the futures exchange (e.g., not calendar months).

The "Final Settlement Price" shall mean the weighted-average of all First-Nearby month trades of the contract executed on the exchange floor, and/or on an approved electronic trading platform as determined by the exchange, within one or more set periods for example, during the final thirty (30) minutes of trading on a specified day (such as the contract expiry day of the then current month).

The "Spread Index" shall mean the weighted-average of all "bona fide" First-Nearby/Second-Nearby spread transactions, where such transactions include a purchase in one of the two months, executed simultaneously with a sale of equal volume in the other month at an agreed upon price differential) executed on the exchange floor, and/or electronic platform, within a set time period, for example, during the final thirty (30) minutes of trading on expiration day.

Bona fide spreads are those supported by a trade ticket with the First-Nearby Month price corresponding with the Futures Exchange "fixed-price" released daily at a set time, for example, fifteen (15) minutes after the market opening. The Futures Exchange determines the fixed-price using a published methodology, such as, for example, the high or low price in the opening daily range, an average of trades in a certain period, a weighted average of trades in a certain period, and the like. The Spread Index of the present embodiment ensures "legged spreads" (spreads executed as two separate outright transactions in the First-Nearby/Second-Nearby contract months, at the current market price) are not included in the Spread Index, thereby causing the spread index to accurately reflect the market. In alternate embodiments, however, legged spreads are considered.

"Matching Day" shall be defined as a specified day after the expiry of the First-Nearby Month contract, for example, the first trading day after expiry. As discussed in greater detail below, market participants will be given until a set time on Matching Day to consolidate their open First-Nearby Month futures, physical partial cargo and physical cargo-size positions to either zero (0), or to cargo-size. Position consolidation can be done through any number of means, including the use of Exchange for Physical (EFP), Exchange for Swap (EFS), Exchange for Option (EFO), Exchange for Futures (EFF), and the like. In the present embodiment, this set time, which is referred to as the "consolidation deadline," is 12:00 PM (noon) EST, although any other time may be used.

As described in greater detail below, any market participant with open First-Nearby Month futures positions after the consolidation deadline on Matching Day will be notified by the Futures Clearinghouse at a set time, such as 3:00 PM EST on Matching Day, whether their First-Nearby Month futures position has been reduced to zero (0), or increased to cargo-size and matched with another market participant for physical delivery.

Having provided definitions for terms used in the present embodiment, the process of consolidating the contracts, including the matching process used to provide market participants with guaranteed physical delivery and to determine which participants will have their first-nearby month position taken to zero or to cargo-size will now be described in greater detail.

Although the present invention may be implemented manually, in the present embodiment, the futures exchange and/or its associated futures clearinghouse utilize a computer system to implement the process. One exemplary computer system is shown in FIG. 1a and includes one or more exchange computer servers 10, or other processors, and an exchange database 12 coupled to an exchange network 14. In general, the exchange servers 10, database 12 and network 14 are accessible by the futures exchange and exchange clearinghouse. As such, the servers 10 are used for setting and clearing trades, managing market participants' margins, compliance and other functions.

Also, in communication with the exchange network 14 are one or more exchange clearing members (cm) 16 and associated computer systems. The clearing members 16 are in communication with the exchange network 14 via communication links, including, for example, electronic gateways and wired and wireless links using any protocol. The clearing members 16 interact with market participants 18, receiving transaction data from and executing transactions on behalf of the market participants 18. As is known, trades are typically registered with and settled through clearing members 16. As such, the clearing members 16 provide position information, including transaction and position data for market participants 18 trading through the communication links to the exchange network 14 and, ultimately, the exchange server 10 and database 12.

The software programming that implements the functionality and processes described herein resides primarily on the servers 10 and may be written in any suitable programming language, including, for example, C++, Visual Basic, PERL, Cobalt, Java and the like. Similarly, the database may employ any suitable hardware and software, including, for example, SQL, DB2 and the like. In general, the database includes tables for storing market participant information, including account and market participant identifiers (IDs), name, contact information, license number, account number and other account identifying information, as well as tables for tracking each transaction entered into by each market participant and each participant's account's positions. Such tables identify each transaction and position as associated with a particular participant, as well as the associated details (e.g., contract, type of position (long or short), sized position (e.g., number of lots), and other contract details). As used herein the term market participant is meant to include all possible individuals and entities trading the contract, whether on the exchange floor or through an approved electronic trading marketplace.

Figure 1B:
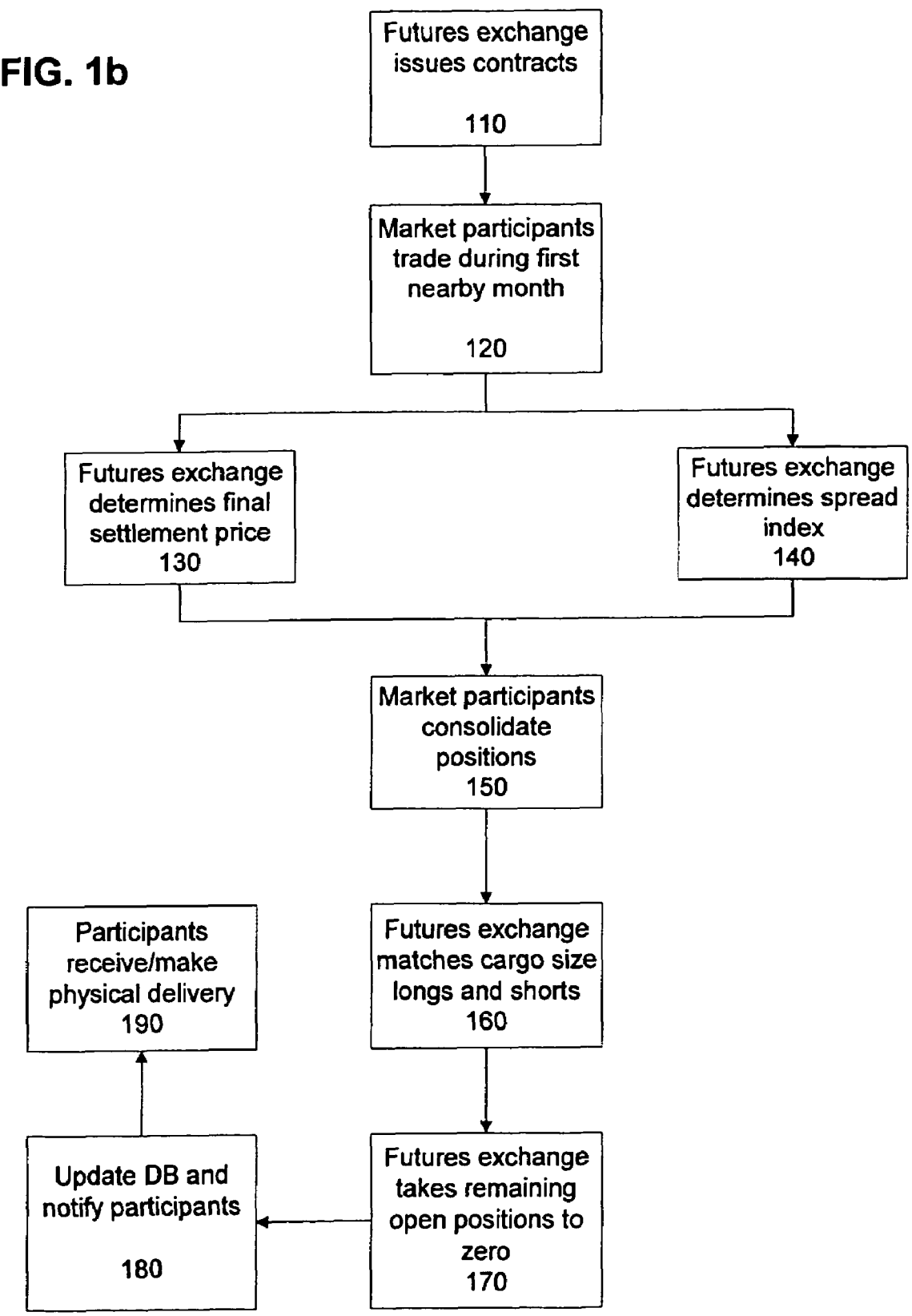
FIG. 1b is a flow chart illustrating the overall process of consolidating futures contracts according to one embodiment of the present invention.

Turning to FIG. 1b, a flow chart illustrating the overall process of consolidating the futures contracts according to the present embodiment will now be described. As initial steps, the futures exchange issues the contracts (step 110), and the market participants begin trading the contracts during the then current month—the first-nearby month (step 120). The market participants continue trading the contracts during the first-nearby month until contract expiry.

As the market participants trade the contract, the futures clearinghouse tracks each participant's transactions and portfolio, updating the appropriate participant records in the database. The Futures Clearinghouse also will enforce margin requirements and withhold appropriate funds from each market participant, to fully cover the changing price exposure of the open first-nearby position. Margin requirements will remain until such time as physical delivery has been completed, and all contractual obligations have been satisfied.

Upon contract expiry, the futures exchange determines the final settlement price for the first-nearby month (step 130) and the spread index (step 140). As described below, these figures are used when adjusting market participants' positions.

Following expiry of the contract, the market participants consolidate their positions for the first-nearby month until the consolidating deadline on matching day. Step 150. Such consolidation may be achieved through any number of means, including EFP, EFS, EFO, EFF and other transactions.

After the consolidation deadline on matching day, the exchange clearinghouse proceeds to match open positions to assure physical delivery. Step 160. In the present embodiment, physical delivery is assured to those market participants having cargo-size, or a multiple thereof, open long or short positions held at the consolidation deadline. In so doing, the Futures Clearinghouse adds to, or subtracts from, as appropriate, the First-Nearby Month futures position of market participants with open positions that are not cargo-size. Step 170. As described in greater detail with regard to FIGS. 2a and 2b, adjustments are made to such market participants' second-nearby month positions to offset the bringing their positions in the first-nearby month to either zero or cargo-size.

Having assured physical delivery by having matched open positions and taken open positions to zero or to cargo-sized positions, the futures clearinghouse updates the database records accordingly and notifies the market participants of physical delivery and any adjustments to their position. Step 180. Finally, the participants so notified take or deliver, as the case may be, physical delivery of the commodity pursuant to terms of the contract. Step 190. The foregoing process is repeated each month (or other period as determined by the exchange), with adjustments made to the market participants' second-nearby month being taken into account.

Figure 2A:
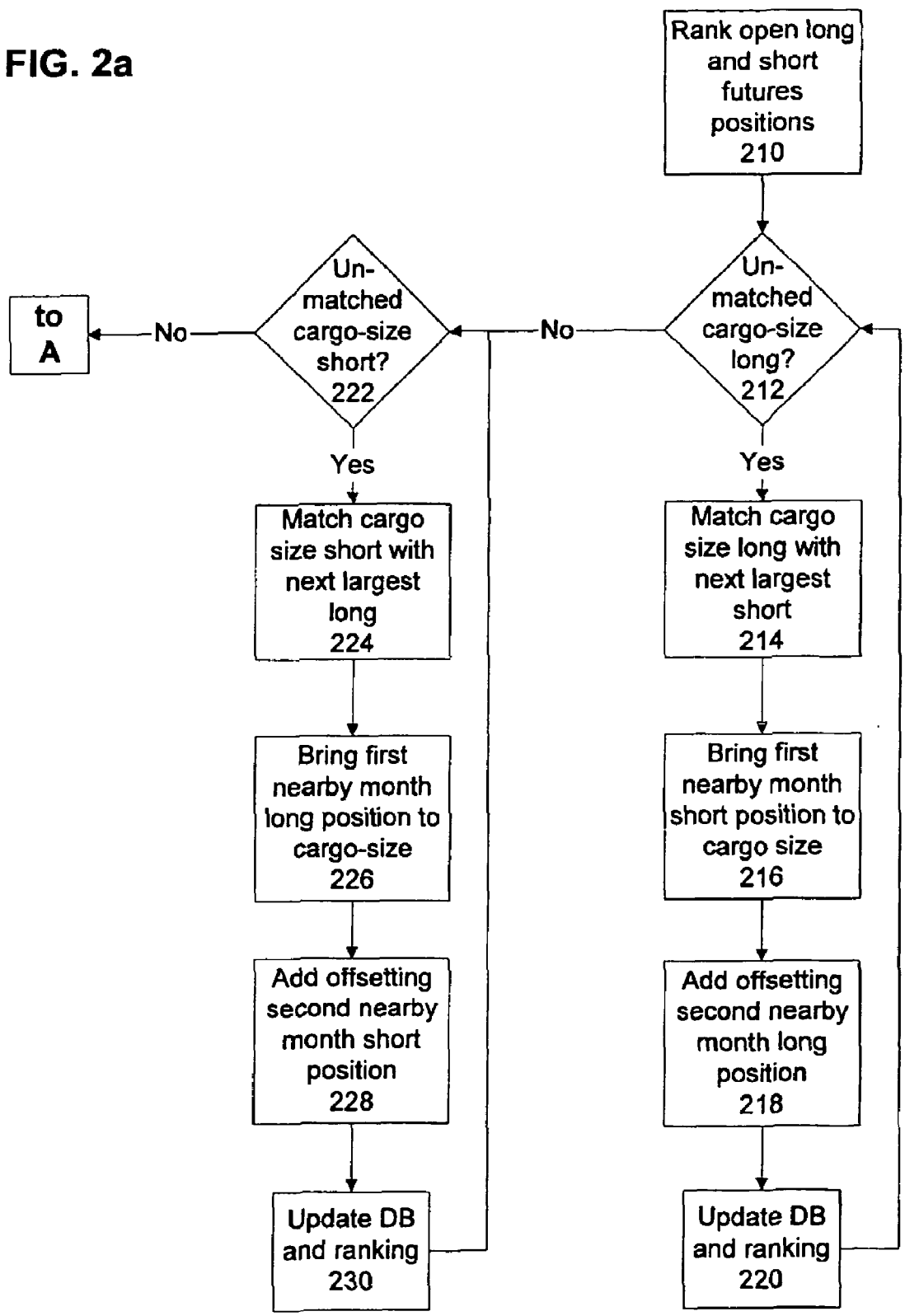

Having thus described the overall process, the matching process will now be described in greater detail with reference to FIGS. 2a and 2b. As noted above, this process is preferably implemented via a specially programmed computer system. In certain embodiments, the matching process is performed automatically, beginning at a specified time, for example, a certain time after the consolidation deadline. After confirmation that all participants' first-nearby month position data has been received, and the like.

As an initial step, the system orders or ranks the positions remaining open at the consolidation deadline based on the size and type (i.e., long or short) of the position. Step 210. It is to be understood that this step is performed to make the searching of the database for the open positions more efficient and, therefore, is optional. Accordingly, in alternate embodiments, the program does not order the records but rather scans the database as needed to identify first-nearby month open positions in accordance with the matching methodology. Furthermore, it is to be understood that the ranking of the open positions may result in a single ranking, with each position identified as either long or short, or as two separate lists—one for each long and short positions. Additionally, the list or lists may either be in separate storage or memory or may be logical (e.g., kept as a linked list).

As noted above, a particular participant may have an open position greater than cargo-size. To handle these positions, the system of the present embodiment first divides the portion into cargo-size portions, with any remainder. For example, a participant's open position of 1400 lots will be divided into two by 600, lot—the cargo-size—positions and a 200 lot position. Each of the positions are treated separately when matching is performed.

Next, the system searches the ranked positions and identifies the largest long position and determines whether it is a cargo-size position or multiple thereof. Step 212. In the event two or more position are cargo-size, the system of the present embodiment randomly selects one to use in providing physical delivery, although other methodologies, which would preferably be published by the exchange, are within the scope of the present invention. Having identified a cargo-size long position, for which the present embodiment guarantees physical delivery, the system proceeds to match the position with the largest open short position. Step 214. If the largest open short position is also cargo-size, then no adjustment to the market participant's first-nearby month position is necessary.

However, if the largest first-nearby month short position is less than cargo-size, then the market participant's position is brought to cargo-size by adding additional short position. Step 216. For that same market participant, the system then adjusts the second-nearby month position to offset the added short position in the first-nearby month. Step 218. The system then updates the database and ranking to indicate which positions have already been applied to the matching process. Step 220. In essence, the exchange has adjusted the short position of one market participant to provide physical delivery. Furthermore, because the system takes the short position in order of largest size, the system first applies cargo-size short positions.

By looping to step 212, the system takes the next largest open long position to match against. As will be appreciated, by taking the open positions in order of size, the system will match all cargo-size long positions first, each time matching the long position against the next largest short position. If, at step 212, the system determines there are no more cargo-size long positions, the system proceeds to match cargo-size short positions to less than cargo-size long positions, thereby assuring those market participants having cargo-size short positions can make physical delivery.

Thus, the next step is determining whether the next largest short position is indeed cargo-size. Step 222. If the next largest short position is cargo-size, it is matched against the next largest long position, which, because all cargo-size long positions have already been addressed (steps 212-220), is less than cargo-size.

Therefore, having identified a long position, the system adds an additional long position to that of the market participant associated with the next largest long position (as identified in the database). Step 224. As with other determinations, the system of the present embodiment randomly selects one of potentially multiple same-size positions, although other methodologies are within the scope of the present invention.

Once the position (and participant) has been identified, the system brings the position to cargo-size by adding the necessary long position to the participant's first-nearby month position. Step 226. The market participant's second-nearby month positions are then adjusted to offset the adjustment to its first-nearby month position by adding a short position equal to the long position added to the participant's first-nearby month position. Step 228. The database and ranking are updated to reflect the adjustments to the participant's positions and to identify the position as having been applied to the matching process so it is treated only once. Step 230.

As with the matching of cargo-sized long positions, the matching of cargo-size short positions is repeated until all cargo-size short positions are matched, each with a long position of successively smaller size.

When the system determines there are no additional cargo-size short positions in the first-nearby month (step 222), the system proceeds to zero-out all remaining less than cargo-size first-nearby month positions. Although this can be achieved in any of a number of ways and in any order, the present embodiment first examines the ranking and determines whether there are any unmatched less than cargo-size long positions. Step 232. If so, the open long position is taken to zero by adding to the first-nearby month position of the market participant (as identified in the database as having the subject position) a short equal in size to the open long position. Step 234. In conjunction with adding the short position, the participant's second-nearby month position is adjusted by adding a long position equal in size to the short added to the first-nearby month position, thereby offsetting the short added in the first-nearby month. Step 236. The process loops through the steps to bring the unmatched, less than cargo-size positions to zero.

Next, the system brings any remaining unmatched, less than cargo-size short positions to zero. This subprocess begins with the system identifying any such positions by examining the ranking. Step 238. If such a position exists, the system brings it to zero by adding to the first-nearby month position of the participant having the identified short position a long position equal in size to the short position. Step 240. As with the unmatched longs, the system must offset changes to the first-nearby month position with changes to the participant's second-nearby month position. Consequently, the system then adds to the participant's second-nearby month position a short equal in size to the long position added in the first-nearby month position. Step 242. In essence, the zeroed out first-nearby month position is carried over to the second-nearby month. Once the system has brought all unmatched short positions to zero, the process is deemed complete.

As noted above, adjustments made to a participants' first-nearby month positions (whether bringing a position to zero or to cargo-size) are offset by changes to the participant's second-nearby month position. While various mechanisms for effectuating such offsetting are within the scope of the present invention, in the present embodiment, the price of the positions that the Futures Clearinghouse adds to or subtracts from any First-Nearby Month position will be at the Final Settlement Price. Additionally, the Futures Clearinghouse will offset any positions added to or subtracted from the First-Nearby futures position of the market participant with an opposite Second-Nearby futures position of equal volume or size, at a price equal to the difference between the Final Settlement Price and the Spread Index. As will be appreciated by those skilled in the art, calculating the price in this manner, namely, using the Final Settlement Price and Spread Index, has the benefit of enabling futures market participants the opportunity to consolidate positions without exposure to changing commodity prices (often referred to in the trading vernacular as flat price risk) during the time period required for position consolidation and matching.

In alternate embodiments, the price used when adjusting a participant's first-nearby month position is not the final settlement price as describe above, but rather is based on a basket of commodities or grades of a commodities, or a formula, algorithm, moving average, weighted average, simple average and the like of a commodity, basket of commodities or grades of commodity.

Once the open positions have been matched or taken to zero or to cargo-size, as the case may be, physical delivery is effectuated according to the terms and conditions of a prevailing physical market contract, as required by the terms and conditions of the futures contract. Alternatively, the terms and conditions of the futures contract itself may specify how physical delivery is to be effectuated. In other words, the contract requires each matched pair of participants to enter into a separate physical forward contract, by which the short participant is obligated to deliver and the long participant is obligated to take a cargo-size physical delivery.

It should be understood that other matching methodologies may be used while staying within the scope of the present invention. For example, rather than ordering the positions and matching full cargo lots for physical delivery based on the size of the positions, the matching could be random or pseudo-random or based on any other rule (e.g., positions meeting any one or more criteria, such as those within a certain percentage of full cargo, will be matched, with any further matching being random). Furthermore, while the embodiment of FIGS. 2a and 2b first matches cargo-size long positions, alternate embodiments may first match cargo-size short positions. In other embodiments, although current operating requirements/constraints at the loading ports do not allow multiple parties to share or partition a single cargo, matching of alternate embodiments includes aggregating positions of multiple market participants for purposes of achieving a cargo-size position. In such an embodiment, participants could express a desire to have their positions aggregated when the system matches positions, and the contract could guarantee physical delivery using any of a number of operating procedures, including those described herein and partial forward contracts. Additionally, participants' position could be matched based, at least in part, on other factors specified by the participants, such as desired port of delivery.

Having described the process of the present embodiment in generic terms, specific illustrative examples will now be discussed. For purposes of the present example, after contract expiry of the First-Nearby month, there is one market participant with a cargo-size (in this example, 600 lots/600,000 barrel) long futures position, and two market participants with short futures positions of 400 and 200 lots, respectively. The 400 lot futures short position will have 200 lots of First-Nearby month future shorts added to their position, at the Final Settlement Price, thereby bringing the position to cargo-size. Such first-nearby month adjustment will be offset by adding 200 Second-Nearby month futures longs to that participant's position. The price of the Second-Nearby futures longs added will be the difference between the Final Settlement Price and the Spread Index. A guaranteed physical delivery will result, with the market participant with the original 600 lot long futures position receiving a 600,000 barrel physical delivery from the market participant with the original 400 lot short futures position.

Additionally, the market participant having the 200 lot short futures will have its First-Nearby futures position reduced to zero at the Final Settlement Price, and have an offsetting 200 lot short futures position added to their Second-Nearby futures position, at the difference between the Final Settlement Price and the Spread Index. No physical delivery results for this market participant.

In embodiments where positions may be aggregated, the positions of the two short market participants (i.e., those short 400 lots and 200 lots) are logically aggregated and matched against the cargo-size long position of the long market participant.

Another, more detailed, illustrative example assumes a First-Nearby Final Settlement Price of $30.00, a Spread Index=$0.50 (specified as a premium to First-Nearby Month Final Settlement Price) and Second-Nearby Calculated Price=$29.50.

The example further assumes that, as determined on Matching Day (after the consolidation deadline), the open first-nearby month positions are as follows:
Matching Day Open Interest=1,200 lots
One futures long (participant A) with 1,200 lot position
Four short futures (participants B, C, D and E) with the following positions: B=500 lots, C=400 lots, D=200 lots, and E=100 lots.

The Futures Clearinghouse matches B's 500 lot short and C's 400 lot short with the 1,200 lot long of A to create two physical cargoes. The futures long enters into physical forward contract (in the example for North Sea Light Crude Oil contract described below, a BFO forward contracts pursuant to the terms and conditions of term 12. Guaranteed Physical Delivery of the contract) with futures short participants B and C.

Accordingly, the changes in market participant futures positions (in lots) as a result of matching are as follows (where a "−" indicates short position and a "+" indicates a long position):
B=−100 First-Nearby at $30.00+100 Second-Nearby at $29.50;
C=−200 First-Nearby at $30.00+200 Second-Nearby at $29.50;
D=+200 First-Nearby at $30.00-200 Second-Nearby at $29.50; and
E=+100 First-Nearby at $30.00-100 Second-Nearby at $29.50.

Accordingly, the final net result to the physical positions of the market participants are as follows:
Participant A receives one 600,000 barrel cargo from B; and
Participant A receives one 600,000 barrel cargo from C.

As noted above, many commodities; including those that load on large, ocean-going vessels, such as any of the global benchmark crude oil grades, are within the scope of the present invention. In one such embodiment that will now be discussed (referred herein as the North Sea Light (NSL) Contract), operates similar to the foregoing embodiment. In general, the Futures Clearinghouse identifies all market participants with open First-Nearby futures positions remaining after a specified day and time, and rank them by position size. The Futures Clearinghouse will add to/subtract from all open less than cargo-size First-Nearby Month futures positions to the extent required to meet all cargo-size obligations, which in the present embodiment is guaranteed physical delivery.

If an imbalance remains between the number of qualified cargo-size futures longs and shorts, the Futures Clearinghouse will match the market participant with the largest offsetting less than cargo-size open futures position in the First-Nearby month. If the largest less than cargo size position is held by more than one market participant, the Futures Exchange will randomly, or through some other published methodology, determine which positions will be increased to cargo-size for physical delivery.

When all cargo-size longs and shorts have been matched by the Futures Clearinghouse for physical delivery, all remaining open First-Nearby positions will be taken to zero. Again, the Futures Clearinghouse will offset any lots added or subtracted in the First-Nearby Month futures position of the market participant, with an opposite Second-Nearby Month futures position of equal size.

All market participants will be informed by the Futures Clearinghouse of changes to their positions and their delivery obligations by a set time.

The grades acceptable for physical delivery for the exemplary NSL contract, their loading terminals, and quality differentials are Brent/Sullom Voe in the United Kingdom; Forties/Hound Point in the United Kingdom at par; and Oseberg/Sture in Norway at par.

Out of these grades, Brent is the marker BFO crude. Quality differentials between Brent and the other acceptable grades may be modified by the Futures Exchange from time to time to reflect changing crude qualities and market conditions, with "par" representing no premium or discount for the delivery of a particular grade to the marker crude. For illustration purposes, the commodity in the NSL embodiment will be the contract crude oil, and for purposes of physical delivery, NSL will be linked to the standardized Brent physical ("BFO") forward contract, although other contracts may be used. Furthermore, in an alternative embodiment where the underlying commodity is a petroleum product, fuel oil, LNG, ethanol, fertilizer, or other commodity that loads on large, ocean-going vessels, the physical delivery terms of the futures contract would be modified to comply with the industry standard forward physical contract.

In the present embodiment, NSL cargo-size futures short (s) matched by the Futures Clearinghouse for physical delivery have the right to declare the grade to be delivered. The NSL cargo-size futures long(s) has the right to determine the quantity of crude loaded within an amount, for example, one per-cent (1%) (or any other percentage consistent with the prevailing physical contract), of the standard 600,000 barrels cargo-size (594,000-606,000 barrels). Any imbalance between the actual volume loaded on the tanker, as documented on the Bill of Lading, and 600,000 barrel standard, may be cash settled at the NSL Final Settlement Price within a set period, such as five (5) business days of Bill of Lading date.

Each terminal imposes operational constraints that require large, ocean-going vessels load a minimum volume of crude (approximately 600,000 barrels). The NSL consolidation process gives market participants until 12:00 PM noon EST on Matching Day, to exchange their futures position for a physical position in the forward cash partial cargo or full cargo market, swap market, options market, and the like.

The Futures Clearinghouse will continue to require margin payments from market participants with open First-Nearby futures positions remaining beyond 12:00 PM EST time on Matching Day, to cover the full value of the commodity, as determined by the Futures Exchange. Margin fund requirements will be modified in accordance with the terms of the Futures Exchange, when open positions are moved from the First-Nearby Month to the Second-Nearby Month, or released in instances of guaranteed physical delivery, when the Futures Exchange receives confirmation from both matched market participants that all obligations have been fulfilled under the terms of the contract (for example, under Section 12. Physical Delivery of the exemplary NSL Contract, below).

The Futures Exchange will generate the following NSL pricing indexes, or other indexes beneficial to market participants to meet daily pricing benchmark needs of commercials and non-commercials in various time zones around the world. These indices will have no effect on the determination of the final settlement price.

Daily average price of all First-Nearby trades executed-on the Futures Exchange, referred to as NSL Lightwave 1 (or NSL Line 1 Lightwave);

Daily average price of all Second-Nearby trades executed on the Futures Exchange, referred to as NSL Lightwave 2 (or NSL Line 2 Lightwave);

Average price each day of all First-Nearby trades executed on the Futures Exchange during a set mid-day time range, such as 12:29 PM-12:30 PM EST, referred to as NSL Middex 1 (or NSL Line 1 One-Minute Mid-day Index); and Average price each day of all First-Nearby trades executed on the Futures Exchange during a set mid-day time range, such as 12:25 PM-12:30 PM EST, referred to as NSL Middex 5 (or NSL Line 1 Five-Minute Mid-day Index).

Although it is to be understood that the specific terms and conditions of the contract will vary depending on numerous factors, including for example, the specific commodity and exchange, the following are exemplary terms and conditions of the NSL contract of the present embodiment. The following twelve terms are merely illustrative, as different terms and conditions may be utilized to effectuate the various processes disclosed herein.

1. Scope: The provisions of these rules shall apply to all contracts bought or sold on the Futures Exchange for North Sea Light (NSL) Crude Oil.

2. Reference Crude Oils: For the purpose of this contract, "North Sea Light Sweet Crude Oil" shall be defined as a mixture of hydrocarbons that exist in a liquid phase in naturally occurring underground reservoirs and remains in a liquid state at atmospheric pressure after passing through surface separating facilities and contains less than 0.50% sulfur by weight.

North Sea Light Sweet Crude Oil shall refer to crude oil of current cargo export quality for vessel delivery at storage and terminal installations as follows: (A) Brent at Sullom Voe in the United Kingdom; (B) Forties at Hound Point in the United Kingdom; and (C) Oseberg at Sture in Norway.

3. Grade and Quality Specifications: North Sea Light Crude Oil meeting the following specifications and designations shall be deliverable in satisfaction of futures contract delivery obligations under this rule: (A) Brent Crude Oil; (B) Forties Crude Oil (Deliverable at Par); and (C) Oseberg Crude Oil (Deliverable at Par).

Blends of these crude streams are only deliverable if such blends constitute the terminal's common stream shipment, which meets the grade and quality specifications for cargo export. "Deliverable at Par" refers to no premium or discount for delivering substitute grade for Brent marker.

4. Definitions: For the purpose of the contract of this embodiment, the following terms shall have the meanings set forth below:

Barrel: 42 gallons of 231 cubic inches per gallon corrected for temperature to 60 degrees Fahrenheit;

First-Nearby Month (Expiry Month): the most recent month for which trading is being transacted;

Second-Nearby Month: the month immediately following the First-Nearby Month;

NSL Final Settlement Price: the weighted average of the final 30 minutes of trading in the spot First-Nearby month on contract expiry day. Trading at Settlement (TAS), EFP, EFS, EFO and EFF volumes shall be excluded from the weighted average price. The Futures Exchange shall publish the Final Settlement Price within approximately 30 minutes from the closing bell, on the last day of trading. The Final Settlement Price shall be used for purposes of physical delivery.

NSL Spread Index: the weighted-average of all bona fide First-Nearby/Second-Nearby spread transactions (a purchase in one of the two months executed simultaneously with a sale of equal volume in the other month) executed on the exchange floor during the final 30 minutes of trading on expiration day.

5. Contract Value: The contract value shall be the settlement price multiplied by 1,000.

6. Contract Months: Trading shall be conducted in contracts in such months as shall be determined by the Futures Exchange. Trading in the contract month shall commence on the day fixed by resolution of the Futures Exchange.

7. Prices and Price Fluctuations: Prices shall be quoted in U.S. dollars and cents per barrel. The minimum price fluctuation shall be $0.01 (1 cent) per barrel. The Futures Exchange shall determine any maximum price fluctuation or special price fluctuation limits.

8. Trading Hours: The Futures Exchange shall determine the trading hours for the contract.

9. Termination of Trading: The Futures Exchange shall set a date each month when trading shall end, such as one business day before the twenty-third calendar day prior to the first day of the delivery month. If the twenty-third calendar day is a business holiday in London or New York, or a weekend, trading shall end one business day prior to the twenty-third calendar day.

10. Exchange of Futures for, or in Connection with Physical and the Exchange of Futures for, or in Connection with Swaps, Options or Futures: Any exchange of futures for physical (EFP), exchange of futures for swap (EFS), exchange of futures for option (EFO), or exchange of futures for future (EFF) involving the North Sea Light Sweet Crude Oil futures contract shall be governed rules of the Futures Exchange.

11. Position Matching: All open NSL Longs and Shorts are given until a set time, such as noon (12:00 PM EST) on Matching Day to bring positions to Cargo-Size (increments of 600 lots) or to zero (0 lots) through Exchange for Physical, Exchange for Swap, Exchange for Futures, or Exchange for Option transactions. The Futures Exchange will determine the Matching Day each month, such as one business day after the expiry of the First-Nearby contract (All NSL expiry and matching dates will be published by the Futures Exchange). Exchange Clearing Members with open NSL Long and Short positions after contract expiry, shall inform the Futures Clearinghouse of the aggregate open positions of each of its Market Participants in the delivery month by a set time, such as 5:00 PM EST on expiry day. The Futures Clearinghouse will match all open Cargo-Size (600 lot) Longs and Shorts for Physical Delivery at a set time, such as 3:00 PM EST on Matching Day.

12. Guaranteed Physical Delivery: All physical deliveries resulting from the Futures Clearinghouse matching process will be governed by the General Terms and Conditions of the prevailing physical market contract, such as "Shell Brent Partial Agreement", and the "Shell UK Limited 1990 Agreement for the Sale of Brent Blend Crude Oil on 15 Day Terms" with "Shell 2002 Amendments for 21 Day BFO (Brent, Forties, Oseberg)", although other physical contracts may be used. Any agreement between the trading parties, and approved by the Futures Clearinghouse will supercede these terms and conditions with respect to Guaranteed Physical Delivery matched cargoes.

NSL futures shorts have the ability to declare Brent, Forties or Oseberg under the terms of the BFO forward contract.

NSL futures longs have the ability to determine the loading volume, subject to the 1 percent operational tolerance under the terms of the BFO forward contract. Any difference between the actual delivery and standard cargo-size, currently 600,000 barrels, will be cash settled at the NSL Final Settlement Price within a set period, such as five (5) business days from the Bill of Lading date.

As will be appreciated, the foregoing NSL contract assures market participants with cargo-size futures positions at contract expiry, a physical forward contract with a financially secure counter-party, resulting in a reliable, transparent method for commercials to lock in price protection, refinery supply, or production outlets, while enabling speculators, financial institutions, and hedgers the ability to participate in the contract with relatively small positions, such as positions of 1,000 barrels. Furthermore, because the contract is backed by the futures clearinghouse, the present contract also has the benefit of satisfying audit and banking requirements and scrutiny.

While the invention has been described in conjunction with certain embodiments thereof, various modifications and substitutions can be made thereto without departing from the spirit and scope of the present invention. The invention has only also been described with reference to examples, which are presented for illustration only, and thus no limitation should be imposed. By way of non-limiting example, the particular settlement price and spread index used may be adjusted to essentially any amount deemed equitable; the time at which matching and other steps occur, as well as the order of such steps, may similarly be changed; the contracts may apply to different commodities and can be modified to the extent export terminals change restrictions to permit more than one market participant to load on a single vessel. Furthermore, although certain functions and procedures have been described as being performed by a particular entity, such as the exchange clearinghouse, such functions and procedures may be performed by other entities. Accordingly, the scope of the present invention is to be governed by the claims appended hereto.

What is claimed is:

1. A computer-implemented method for an exchange to adjust positions of market participants in a futures contract based on an underlying commodity, the exchange having a computer operable in accordance with computer programming stored in a computer readable medium to perform the method comprising:

identifying, for physical delivery of the commodity, open first-nearby time positions of a particular size which were held through contract expiry, market participants having the open first-nearby time positions of the particular size being obligated to make or take physical delivery of the commodity pursuant to terms of the contract;

matching the identified open first-nearby time positions of a particular size with other open first-nearby time positions, the other open first-nearby time positions including positions of the particular size or positions of less than the particular size;

making additions to or subtractions from open first-nearby time positions of market participants that are less than the particular size, including making additions to the positions of less than the particular size; and updating an electronic database stored in electronic memory to reflect the additions or subtractions to positions of market participants.

2. The method of claim 1, wherein the making additions to or subtractions from open first-nearby time positions comprises bringing positions to zero or to the particular size, the method further comprising:

offsetting additions to and subtractions from market participants' open first-nearby time positions with opposite positions in a second-nearby time.

3. The method of claim 2 wherein the offsetting comprises determining a final settlement price and a spread index, and offsetting the additions to and subtractions from the first-nearby time positions at a price equal to the difference between the final settlement price and spread index.

4. The method of claim 3 wherein the final settlement price is a weighted average of all first-nearby time trades executed during a first predetermined period prior to market closing on contract expiration day.

5. The method of claim 4 wherein the spread index is a weighted-average of all bona fide first-nearby/second-nearby spread transactions executed during a second predetermined period of trading on contract expiration day, wherein a bona fide first-nearby/second-nearby spread transaction is a purchase in one of the first-nearby time or second-nearby time executed simultaneously with a sale of equal volume in another of the first-nearby time or second-nearby time.

6. The method of claim 1 further comprising establishing a matching day and time on which the additions and subtractions are made.

7. The method of claim 1 wherein the matching of the identified open positions of a particular size includes matching futures longs having the particular size with futures shorts.

8. The method of claim 7 wherein future longs having the particular size are first matched with future shorts having the particular size.

9. The method of claim 7 wherein:

matching comprises matching a first participant's future long position in the first-nearby time equal to the particular size with a second participant's future short position in the first-nearby time in an amount equal to or less than the particular size, and wherein making additions to and subtractions from comprises subtracting from the second participant's first-nearby time position a difference between the particular size and the amount, the method further comprising offsetting the subtracting by adding to the second participant's second-nearby time position the difference.

10. The method of claim 9 wherein:

adding to the second participant's second-nearby time position is at a price equal to the difference between a final settlement price and a spread index.

11. The method of claim 1 wherein the method is for tracking positions in futures contracts for crude oil, and wherein the particular size is 600,000 barrels.

12. A computer-implemented method of an exchange guaranteeing physical delivery for market participants having cargo-size positions in a futures contract based on an underlying commodity, the method comprising:

identifying open first-nearby time positions in the future contract of multiple market participants, the open first-nearby time positions having been held by the market participants through expiry of the future contract and including:

a first number of open cargo-size long positions;
a second number of open cargo-size short positions;
a third number of less than cargo-size long positions; and
a fourth number of less than cargo-size short positions;
pursuant to the futures contract:

using a computer to match any open cargo-size long positions with any open cargo-size short positions;

if the first number equals the second number, then bringing remaining open first-nearby time positions to zero;

if the first number is less than the second number, then matching unmatched cargo-size short positions with less than cargo-size long positions of long participants, increasing the less than cargo-size long positions to cargo-size long positions and adjusting a second-nearby time position of the long participants; and if the first number is greater than the second number, then matching unmatched cargo-size long positions with less than cargo-size short positions of short participants, increasing the less than cargo-size short positions to cargo-size short positions and adjusting a second-nearby time position of the short participants, thereby guaranteeing physical delivery to participants having cargo-size first-nearby time positions.

13. A computer system for adjusting positions of market participants in a futures contract based on an underlying commodity, the system comprising:

one or more communications links receiving market participant position information, the position information including identification of open first-nearby time long positions and open first-nearby time short positions;

one or more processors configured to:

match open first-nearby time long positions and open first-nearby time short positions received from the communication links, the open first-nearby time long positions and open first-nearby time short positions being open beyond contract expiry, wherein matched positions are settled with physical delivery of the commodity pursuant to terms of the contract;

make additions to or subtractions from open first-nearby time positions less than a certain size; and adjust market participant second-nearby time positions based on the additions to or subtractions from open first-nearby time positions.

14. The system of claim 13 further comprising an electronic database in communication with the processors, the database storing market participant position information, wherein adjusting market participant second-nearby time positions includes updating the database.

15. A computer-implemented method of a market participant settling a futures contract based on an underlying commodity with physical delivery of the commodity, the method comprising:

trading the futures contract utilizing a computer on an exchange network, the market participant having an open first-nearby time position in the futures contract, at least a portion of the position being held through expiration of the contract;

having the open portion of the position matched by the exchange to an opposite open first-nearby time future position of a separate market participant; and entering into a physical market contract based on the futures contract with the separate market participant, the physical market contract resulting in physical delivery as settlement of the futures contract;

wherein the open first-nearby time position is less than cargo-size, the method further comprising receiving an adjustment to the open first-nearby time position, the adjustment and the open first-nearby time position equaling a cargo-size position.

16. The method of claim 15 further comprising receiving an adjustment to a second-nearby time position, the adjustment to the second-nearby time position offsetting the adjustment to the first-nearby time position.

17. The method of claim 13 wherein the processors are configured to adjust second-nearby time positions by determining a final settlement price and a spread index and offsetting the additions to and subtractions from the first-nearby time positions at a price equal to the difference between the final settlement price and spread index.

18. The method of claim 17 wherein the final settlement price is a weighted average of all first-nearby time trades executed during a first predetermined period prior to market closing on contract expiration day.

19. The method of claim 18 wherein the spread index is a weighted-average of all bona fide first-nearby/second-nearby spread transactions executed during a second predetermined period of trading on contract expiration day, wherein a bona fide first-nearby/second-nearby spread transaction is a purchase in one of the first-nearby time or second-nearby time executed simultaneously with a sale of equal volume in another of the first-nearby time or second-nearby time.

20. The method of claim 13 wherein the processors are configured to match futures longs having a particular size with futures shorts.

21. The method of claim 20 wherein the processors are configured to first match future longs having the particular size with future shorts having the particular size.

22. The method of claim 20 wherein the processors are configured to:
 match by matching a first participant's future long position in the first-nearby time equal to the particular size with a second participant's future short position in the first-nearby time in an amount equal to less than the particular size;
 subtract from the second participant's first-nearby time position a difference between the particular size and the amount; and
 add to the second participant's second-nearby time position the difference.

23. The method of claim 1 wherein the market participants make or take physical delivery pursuant to a physical forward contract for the underlying commodity.

24. The method of claim 1 wherein all market participants are either identified for physical delivery or have additions to or subtractions from open first-nearby time positions made to their positions.

25. The method of claim 12 wherein the market participants with cargo-size positions make or take physical delivery pursuant to a physical forward contract for the underlying commodity.

26. The method of claim 25 wherein the matching is performed for all market participants and wherein the adjusting of second-nearby time period positions further comprises determining a final settlement pric&and a spread index and offsetting changes in first-nearby time period positions with changes in second-nearby time period positions at a price equal to a difference between the final settlement price and the spread index.

27. The method of claim 26 wherein the final settlement price is a weighted average of all first-nearby time trades executed during a first predetermined period prior to market closing on contract expiration day and wherein the spread index is a weighted-average of all bona fide first-nearby/ second-nearby spread transactions executed during a second predetermined period of trading on contract expiration day.

28. The method of claim 12 wherein the matching is performed for all market participants.

29. The system of claim 13 wherein the physical delivery is pursuant to a physical forward contract for the underlying commodity.

30. The system of claim 13 wherein the processors are configured to match or to make additions to or subtractions from all open first-nearby time positions and
 wherein the processors are configured to adjust the second-nearby time positions at a price equal to a difference between a final settlement price and a spread index.

31. The system of claim 13 wherein the processors are configured to match or to make additions to or subtractions from all open first-nearby time positions.

32. The method of claim 16 wherein the adjusting of the second-nearby time period position comprises determining a final settlement price and a spread index, and offsetting the adjustment in the first-nearby time period position at a price equal to a difference between the final settlement price and the spread index.

33. The method of claim 32 wherein the final settlement price is a weighted average of all first-nearby time trades executed during a first predetermined period prior to market closing on contract expiration day and wherein the spread index is a weighted-average of all bona fide first-nearby/ second-nearby spread transactions executed during a second predetermined period of trading on contract expiration day.

34. A computer-implemented method for an exchange to adjust positions of market participants in a futures contract based on an underlying commodity, the exchange having a computer operable in accordance with computer programming stored in a computer readable medium, the method comprising:
 utilizing the computer to identify, for physical delivery of the commodity, first-nearby time futures contract positions held through contract expiry of a particular size, the first-nearby time positions of the particular size being held through contract expiry by market participants being obligated to make or take physical delivery of the commodity pursuant to terms of the contract;
 making additions to or subtractions from open first-nearby time positions of market participants that are less than the particular size; and
 updating records in an electronic database stored in electronic memory based on market participant positions.

35. The method of claim 34, wherein the making additions to or subtractions from open first-nearby time positions comprises bringing positions to zero or to the particular size, the method further comprising:
 offsetting additions to and subtractions from market participants' open first-nearby time positions with opposite positions in a second-nearby time.

36. The method of claim 35 wherein the offsetting comprises determining a final settlement price and a spread index, and offsetting the additions to and subtractions from the first-nearby time positions at a price equal to the difference between the final settlement price and spread index.

37. The method of claim 36 wherein the final settlement price is a weighted average of all first-nearby time trades executed during a first predetermined period prior to market closing on contract expiration day.

38. The method of claim 37 wherein the spread index is a weighted-average of all bona fide first-nearby/second-nearby spread transactions executed during a second predetermined period of trading on contract expiration day, wherein a bona fide first-nearby/second-nearby spread transaction is a purchase in one of the first-nearby time or second-nearby time executed simultaneously with a sale of equal volume in another of the first-nearby time or second-nearby time.

39. The method of claim 34 further comprising establishing a matching day and time on which the additions and subtractions are made.

40. The method of claim 34 further comprising matching futures longs having the particular size with futures shorts.

41. The method of claim 40 wherein future longs having the particular size are first matched with future shorts having the particular size.

42. The method of claim 40 wherein:
matching comprises matching a first participant's future long position in the first-nearby time equal to the particular size with a second participant's future short position in the first-nearby time in an amount equal to or less than the particular size, and
wherein making additions to and subtractions from comprises subtracting from the second participant's first-nearby time position a difference between the particular size and the amount, the method further comprising offsetting the subtracting by adding to the second participant's second-nearby time position the difference.

43. The method of claim 42 further comprising matching futures shorts having the particular size with futures longs.

44. The method of claim 42 wherein:
adding to the second participant's second-nearby time position is at a price equal to the difference between a final settlement price and a spread index.

45. The method of claim 34 wherein the market participants make or take physical delivery pursuant to a physical forward contract for the underlying commodity.

46. The method of claim 45 wherein all market participants are either identified for physical delivery or have additions to or subtractions from open first-nearby time positions made to their positions.

47. A computer-implemented method of an exchange guaranteeing physical delivery for market participants having cargo-size positions in a futures contract based on an underlying commodity, the method comprising:
identifying open first-nearby time positions in the future contract of multiple market participants, the open first-nearby time positions being held through contract expiry and including:
a first number of open cargo-size long positions;
a second number of open cargo-size short positions;
a third number of less than cargo-size long positions; and
a fourth number of less than cargo-size short positions;
pursuant to the futures contract:
using a computer to match any open cargo-size long positions with any open cargo-size short positions;
if the first number equals the second number, then bringing remaining open first-nearby time positions to zero;
if the first number is less than the second number, then matching unmatched cargo-size short positions with less than cargo-size long positions of long participants, increasing the less than cargo-size long positions to cargo-size long positions and adjusting a second-nearby time position of the long participants; and
if the first number is greater than the second number, then matching unmatched cargo-size long positions with less than cargo-size short positions of short participants, increasing the less than cargo-size short positions to cargo-size short positions and adjusting a second-nearby time position of the short participants, thereby guaranteeing physical delivery to participants having cargo-size first-nearby time positions.

48. The method of claim 47 wherein the matching pursuant to the futures contract of first-nearby time positions occurs after expiry of the futures contract of the first-nearby time positions.

49. A computer-implemented method of a market participant settling a futures contract based on an underlying commodity with physical delivery of the commodity, the method comprising:
trading the futures contract utilizing a computer on an exchange network, the market participant having an open first-nearby time future position, at least a portion of the position being held through contract expiry;
having the portion of the position held through contract expiry matched by the exchange to an opposite first-nearby time future position through contract expiry by a separate market participant; and
entering into a physical market contract based on the futures contract with the separate market participant, the physical market contract resulting in physical delivery as settlement of the futures contract;
wherein the first-nearby time position held through contract expiry is less than cargo-size, the method further comprising receiving an adjustment to the first-nearby time position held through contract expiry, the adjustment and the first-nearby time position held through contract expiry equaling a cargo-size position.

50. The method of claim 49 further comprising receiving an adjustment to a second-nearby time position, the adjustment to the second-nearby time position offsetting the adjustment to the first-nearby time position.

* * * * *